United States Patent
Ha

(10) Patent No.: US 12,495,724 B2
(45) Date of Patent: Dec. 9, 2025

(54) SEMICONDUCTOR DEVICE AND METHOD FOR FABRICATING THE SAME

(71) Applicant: SK hynix Inc., Icheon-si (KR)

(72) Inventor: Tae Jung Ha, Icheon-si (KR)

(73) Assignee: SK HYNIX INC., Icheon-si (KR)

( * ) Notice: Subject to any disclaimer, the term of this patent is extended or adjusted under 35 U.S.C. 154(b) by 495 days.

(21) Appl. No.: 17/903,738

(22) Filed: Sep. 6, 2022

(65) Prior Publication Data

US 2023/0131200 A1  Apr. 27, 2023

(30) Foreign Application Priority Data

Oct. 27, 2021 (KR) .......................... 10-2021-0144323

(51) Int. Cl.
| | |
|---|---|
| *H10N 70/00* | (2023.01) |
| *H10B 61/00* | (2023.01) |
| *H10B 63/10* | (2023.01) |
| *H10N 50/10* | (2023.01) |

(52) U.S. Cl.
CPC ......... *H10N 70/8833* (2023.02); *H10B 63/10* (2023.02); *H10N 70/061* (2023.02); *H10N 70/841* (2023.02)

(58) Field of Classification Search
CPC ............. H10N 70/8833; H10N 70/061; H10N 70/841; H10N 70/043; H10N 70/25; H10N 70/826; H10N 70/883; H10N 50/10; H10B 63/10; H10B 63/20; H10B 63/80; H10B 63/845; G06F 3/0656; G06F 12/08

See application file for complete search history.

(56) References Cited

U.S. PATENT DOCUMENTS

| | | |
|---|---|---|
| 9,177,916 B1 | 11/2015 | Barabash et al. |
| 9,425,237 B2 | 8/2016 | Jo |
| 9,960,350 B2 | 5/2018 | Ha |
| 10,910,552 B2 | 2/2021 | Lee et al. |
| 11,430,951 B2 | 8/2022 | Jiang et al. |
| 2016/0308127 A1* | 10/2016 | Kim .................... H10N 70/043 |
| 2017/0053965 A1* | 2/2017 | Baek ..................... H10N 50/10 |
| 2017/0092851 A1* | 3/2017 | Han ........................ H10B 61/20 |
| 2019/0051700 A1* | 2/2019 | Kim ........................ G11C 11/161 |
| 2019/0214554 A1* | 7/2019 | Li ........................... H10N 50/01 |
| 2020/0006428 A1* | 1/2020 | Jiang ................. G11C 13/0026 |

(Continued)

FOREIGN PATENT DOCUMENTS

| | | |
|---|---|---|
| CN | 102034759 A | 4/2011 |
| CN | 110036479 A | 7/2019 |

(Continued)

OTHER PUBLICATIONS

Christophe Lacuyer; David C. Brock; Jay Last, "Appendix," in Makers of the Microchip: A Documentary History of Fairchild Semiconductor, MIT Press, 2010 (Year: 2010).

(Continued)

*Primary Examiner* — Omar F Mojaddedi
(74) *Attorney, Agent, or Firm* — Perkins Coie LLP

(57) ABSTRACT

A semiconductor device that includes: first conductive lines; second conductive lines disposed over the first lines to be spaced apart from the first lines; and a selector layer disposed between the first lines and the second lines and including a dielectric material and a dopant doped with a uniform dopant profile.

9 Claims, 12 Drawing Sheets

(56) References Cited

U.S. PATENT DOCUMENTS

| | | |
|---|---|---|
| 2020/0006643 A1 | 1/2020 | Gosavi et al. |
| 2020/0161372 A1 | 5/2020 | Beckmann et al. |
| 2021/0183945 A1 | 6/2021 | Song |
| 2023/0131200 A1 | 4/2023 | Ha |

FOREIGN PATENT DOCUMENTS

| | | |
|---|---|---|
| CN | 112993155 A | 6/2021 |
| KR | 102030341 B1 | 10/2019 |

OTHER PUBLICATIONS

First Office Action for CN Appl. No. 202211259659.X, mailed on Aug. 16, 2025, 11 pages with English translation.

\* cited by examiner

SEMICONDUCTOR DEVICE AND METHOD FOR FABRICATING THE SAME

PRIORITY CLAIM AND CROSS-REFERENCE TO RELATED APPLICATION

This patent document claims the priority and benefits of Korean Patent Application No. 10-2021-0144323 filed on Oct. 27, 2021, which is incorporated herein by reference in its entirety.

TECHNICAL FIELD

This patent document relates to memory circuits or devices and their applications in electronic devices or systems.

BACKGROUND

The recent trend toward miniaturization, low power consumption, high performance, and multi-functionality in the electrical and electronics industry has compelled the semiconductor manufacturers to focus on high-performance, high capacity semiconductor devices. Examples of such high-performance, high capacity semiconductor devices include memory devices that can store data by switching between different resistance states according to an applied voltage or current. The semiconductor devices may include an RRAM (resistive random access memory), a PRAM (phase change random access memory), an FRAM (ferroelectric random access memory), an MRAM (magnetic random access memory), an electronic fuse (E-fuse).

SUMMARY

The disclosed technology in this patent document includes memory circuits or devices and their applications in electronic devices or systems and various implementations of an electronic device, in which a semiconductor device which can improve cell-to-cell variation and reduce manufacturing cost by forming a doped selector layer with a uniform dopant profile through a single patterning process.

In one aspect, a semiconductor device may include: first conductive lines; second conductive lines disposed over the first lines to be spaced apart from the first lines; and a selector layer disposed between the first lines and the second lines and including a dielectric material and a dopant doped with a uniform dopant profile.

In another aspect, a method for fabricating a semiconductor device may include: forming trenches on a dielectric material formed over a substrate; forming first conductive lines in the trenches such that first conductive lines and first dielectric layers are arranged over the substrate; forming partition layers over the first dielectric layers at a first center-to-center distance between adjacent first dielectric layers, wherein the first center-to-center distance may be twice a center-to-center distance between adjacent first conductive lines, and wherein the partition layers include a dielectric material; forming a dielectric material layer to be formed as a selector layer over the first conductive lines, the first dielectric layers and the partition layers; and forming an initial selector layer by performing a first ion implantation of a dopant into the dielectric material layer at a first tilt angle and by performing a second ion implantation of the dopant into the dielectric material layer at a second tilt angle, wherein the first tilt angle may be in an opposite direction to the second tilt angle with respect to a line perpendicular to surfaces of the layers, and the initial selector layer has a uniform dopant profile.

DETAILED DESCRIPTION

Hereinafter, various embodiments of the disclosure will be described in detail with reference to the accompanying drawings.

Figure 1A:
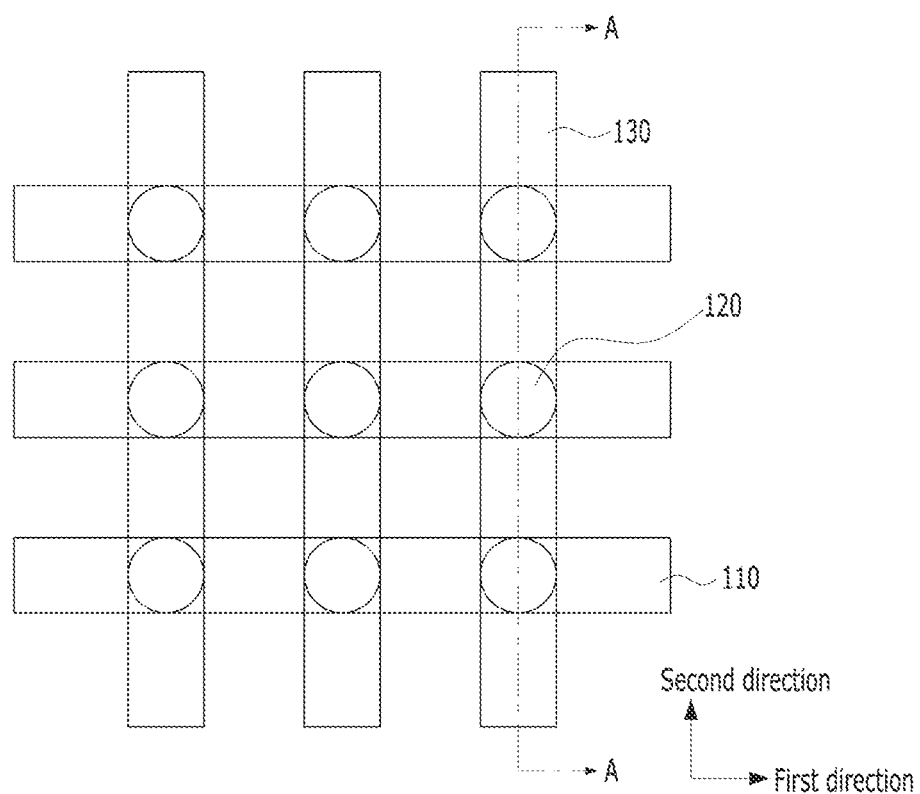
FIGS. 1A and 1B illustrate a semiconductor device based on some implementations of the disclosed technology.
Figure 1B:
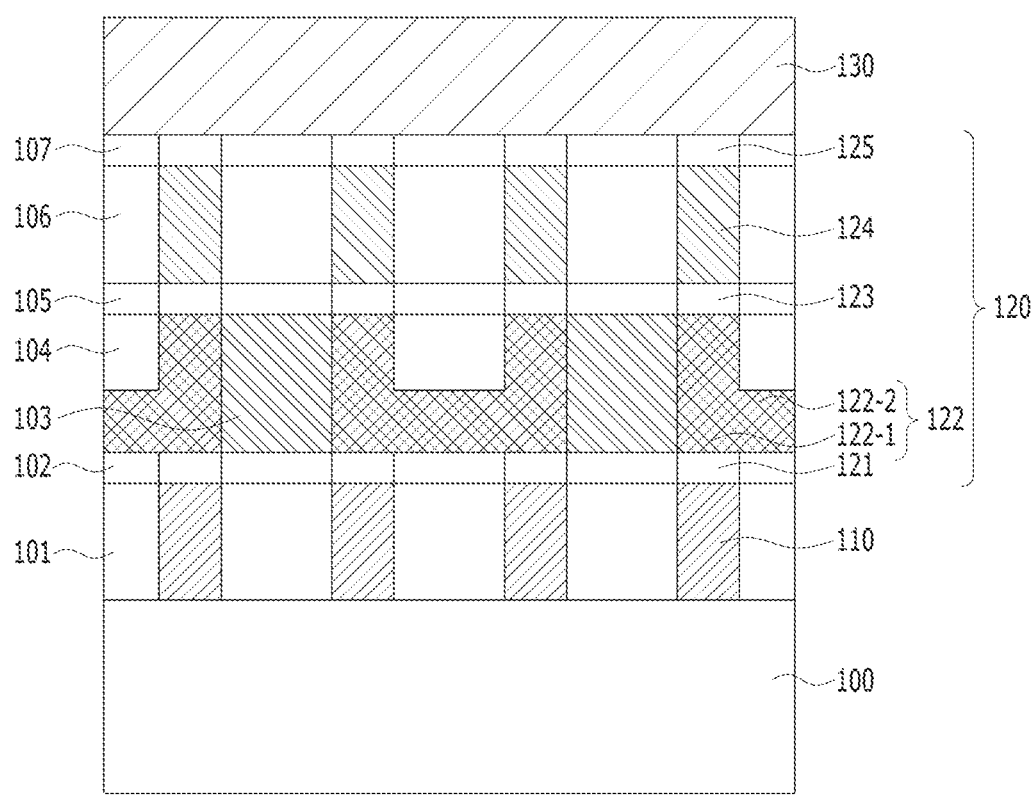

FIGS. 1A and 1B illustrate a semiconductor device based on some implementations of the disclosed technology. FIG. 1A is a plan view, and FIG. 1B is a cross-sectional view taken along line A-A' of FIG. 1A.

Referring to FIGS. 1A and 1B, the semiconductor device may include a cross point structure including a substrate 100, first conductive lines 110 formed over the substrate 100 and extending in a first direction, second conductive lines 130 formed over the first conductive lines 110 to be spaced apart from the first conductive lines 110 and extending in a second direction crossing the first direction, and memory cells 120 disposed at intersections of the first conductive lines 110 and the second conductive lines 130 between the first conductive lines 110 and the second conductive lines 130.

The substrate 100 may include a semiconductor material such as silicon. A required lower structure (not shown) may be formed in the substrate 100. For example, the substrate 100 may include a driving circuit (not shown) electrically connected to the first conductive lines 110 and/or the second conductive lines 130 to control operations of the memory cells 120. In this patent document, the conductive lines can indicate conductive structures that electrically connect two or more circuit elements in the semiconductor device. In some implementations, the conductive lines include word lines that are used control access to memory cells in the memory device and bit lines that are used to read out information stored in the memory cells. In some implementations, the conductive lines include interconnects that carry signals between different circuit elements in the semiconductor device.

The first conductive line 110 and the second conductive line 130 may be connected to a lower end and an upper end of the memory cell 120, respectively, and may transmit a voltage or a current to the memory cell 120 to drive the memory cell 120. When the first conductive line 110 functions as a word line, the second conductive line 130 may function as a bit line. Conversely, when the first conductive line 110 functions as a bit line, the second conductive line 130 may function as a word line. The first conductive line 110 and the second conductive line 130 may include a single-layer or multilayer structure including one or more of various conductive materials. Examples of the conductive materials may include a metal, a metal nitride, or a conductive carbon material, or a combination thereof, but are not limited thereto. For example, the first conductive line 110 and the second conductive line 130 may include tungsten (W), titanium (Ti), tantalum (Ta), platinum (Pt), aluminum (Al), copper (Cu), zinc (Zn), nickel (Ni), cobalt (Co), lead (Pb), tungsten nitride (WN), tungsten silicide (WSi), titanium nitride (TiN), titanium silicon nitride (TiSiN), titanium aluminum nitride (TiAlN), tantalum nitride (TaN), tantalum silicon nitride (TaSiN), tantalum aluminum nitride (TaAlN), carbon (C), silicon carbide (SiC), or silicon carbon nitride (SiCN), or a combination thereof.

The memory cell 120 may be arranged in a matrix having rows and columns along the first direction and the second direction so as to overlap the intersection regions between the first conductive lines 110 and the second conductive lines 130. In an implementation, each of the memory cells 120 may have a size that is substantially equal to or smaller than that of the intersection region between each corresponding pair of the first conductive lines 110 and the second conductive lines 130. In another implementation, each of the memory cells 120 may have a size that is larger than that of the intersection region between each corresponding pair of the first conductive lines 110 and the second conductive lines 130.

Spaces between the first conductive line 110, the second conductive line 130 and the memory cell 120 may be filled with a dielectric layer. The dielectric layer may include a first interlayer dielectric layer 101, a second interlayer dielectric layer 102, a partition layer 103, a third interlayer dielectric layer 104, a fourth interlayer dielectric layer 105, a fifth interlayer dielectric layer 106 and a sixth interlayer dielectric layer 107. Each of the dielectric layers 101 to 107 may include a dielectric material. Examples of the dielectric material may include an oxide, a nitride, or a combination thereof. Each of the dielectric layers 101 to 107 may include the same material as each other or different materials from each other. In some implementations, the semiconductor device may include a plurality of first conductive lines structured to electrically connect two or more circuit elements in the semiconductor device, a plurality of second conductive lines structured to electrically connect two or more circuit elements in the semiconductor device and disposed over the first conductive lines to be spaced apart from the first conductive lines, and a plurality of selector layers disposed between the first conductive lines and the second conductive lines. In one example, the selector layers include a dielectric material and a dopant doped with a uniform dopant profile. In some implementations, the semiconductor device further includes first dielectric layers disposed in spaces between the first conductive lines, partition layers disposed in first spaces between the selector layers and over the first dielectric layers, and second dielectric layers disposed in second spaces between the selector layers and over the first dielectric layers. Here, the first dielectric layer may include the first interlayer dielectric layer 101, and the second dielectric layer may include the fifth interlayer dielectric layer 106.

The memory cell 120 may include a stacked structure including a lower electrode layer 121, a selector layer 122, a middle electrode layer 123, a variable resistance layer 124 and an upper electrode layer 125.

The lower electrode layer 121 may be interposed between the first conductive line 110 and the selector layer 122 and disposed at a lowermost portion of each of the memory cells 120. The lower electrode layer 121 may function as a circuit node that carries a voltage or a current between a corresponding one of the first conductive lines 110 and the remaining portion (e.g., the elements 122, 123, 124 and 125) of each of the memory cells 120. The middle electrode layer 123 may be interposed between the selector layer 122 and the variable resistance layer 124. The middle electrode layer 123 may electrically connect the selector layer 122 and the variable resistance layer 124 to each other while physically separating the selector layer 122 and the variable resistance layer 124 from each other. The upper electrode layer 125 may be disposed at an uppermost portion of the memory cell 120 and function as a transmission path of a voltage or a current between the rest of the memory cell 120 and a corresponding one of the second conductive lines 130.

The lower electrode layer 121, the middle electrode layer 123 and the upper electrode layer 125 may include a single-layer or multilayer structure including various conductive materials such as a metal, a metal nitride, a conductive carbon material, or a combination thereof, respectively. For example, the lower electrode layer 121, the middle electrode layer 123 and the upper electrode layer 125 may include tungsten (W), titanium (Ti), tantalum (Ta), platinum (Pt), aluminum (Al), copper (Cu), copper (Cu), zinc (Zn), nickel (Ni), cobalt (Co), lead (Pb), tungsten nitride (WN), tungsten silicide (WSi), titanium nitride (TiN), titanium silicon nitride (TiSiN), titanium aluminum nitride (TiAlN), tantalum nitride (TaN), tantalum silicon nitride (TaSiN), tantalum aluminum nitride (TaAlN), carbon (C), silicon carbide (SiC), or silicon carbon nitride (SiCN), or a combination thereof.

The lower electrode layer 121, the middle electrode layer 123 and the upper electrode layer 125 may include the same material as each other or different materials from each other.

The lower electrode layer 121, the middle electrode layer 123 and the upper electrode layer 125 may have the same thickness as each other or different thicknesses from each other.

The selector layer 122 may serve to control access to the variable resistance layer 124. To this end, the selector layer 122 may have a characteristic for adjusting the flow of a current according to the magnitude of the applied a voltage or a current, that is, for blocking or substantially limiting a current flowing through the memory cell 120 when a magnitude of an applied voltage is less than a predetermined threshold value and for allowing a current flowing through the memory cell 120 to abruptly increase when the magnitude of the applied voltage is equal to or greater than the threshold value. The selector layer 122 may include an MIT (Metal Insulator Transition) material such as $NbO_2$, $TiO_2$, $VO_2$, $WO_2$, or others, an MIEC (Mixed Ion-Electron Conducting) material such as $ZrO_2(Y_2O_3)$, $Bi_2O_3$—BaO, $(La_2O_3)_x(CeO_2)_{1-x}$, or others, an OTS (Ovonic Threshold Switching) material including chalcogenide material such as $Ge_2Sb_2Te_5$, $As_2Te_3$, $As_2$, $As_2Se_3$, or others, or a tunneling insulating material such as silicon oxide, silicon nitride, a metal oxide, or others. A thickness of the tunneling insulating layer is sufficiently small to allow tunneling of electrons under a given voltage or a given current. The selector layer 122 may include a single-layer or multilayer structure.

In one implementation, the selector layer 122 may be configured to perform a threshold switching operation. In this patent document, the term "threshold switching operation" can be used to indicate turning on or off the selector layer 122 while an external voltage is applied to the selector layer 122. The absolute value of the external voltage may be controlled to gradually increase or decrease. When the absolute value of the external voltage applied to the selector layer 122 increases, the selector layer 122 may be turned on to be electrically conductive to allow a current to flow through when the absolute value of the external voltage is greater than a first threshold voltage. Once the selector layer 122 is turned on, the increase of the external voltage causes an operation current flowing therethrough to increase non-linearly. When the absolute value of the external voltage applied to the selector layer 122 decreases after the selector layer 122 is turned on, the operation current flowing through the selector layer 122 decreases nonlinearly and is turned off when the absolute value of the external voltage further decreases to a voltage value that is less than a second threshold voltage. As such, the selector layer 122 performing the threshold switching operation may have a non-memory operation characteristic.

In some implementations, the selector layer 122 may perform a threshold switching operation through a doped region formed in a material layer for the selector layer 122. Thus, a size of the threshold switching operation region may be controlled by a distribution area of the dopants. The dopants may form trap sites for charge carriers in the material layer for the selector layer 122. The trap sites may capture the charge carriers moving in the selector layer 122 between a middle electrode layer 123 and an upper electrode layer 125, based on an external voltage applied to the selector layer 122. The trap sites thereby provide a threshold switching characteristic and are used to perform a threshold switching operation.

In some implementations, the selector layer 122 may include a dielectric material having incorporated dopants. The selector layer 122 may include an oxide with dopants, a nitride with dopants, or an oxynitride with dopants, or a combination thereof such as silicon oxide, titanium oxide, aluminum oxide, tungsten oxide, hafnium oxide, tantalum oxide, niobium oxide, silicon nitride, titanium nitride, aluminum nitride, tungsten nitride, hafnium nitride, tantalum nitride, niobium nitride, silicon oxynitride, titanium oxynitride, aluminum oxynitride, tungsten oxynitride, hafnium oxynitride, tantalum oxynitride, or niobium oxynitride, or a combination thereof. The dopants doped into the selector layer 122 may include an n-type dopant or a p-type dopant and be incorporated for example, by ion implantation process. Examples of the dopants may include one or more of boron (B), nitrogen (N), carbon (C), phosphorous (P), arsenic (As), aluminum (Al), silicon (Si) and germanium (Ge). For example, the selector layer 122 may include As-doped silicon oxide or Ge-doped silicon oxide.

In some implementations, a doped selector may be formed by depositing a dielectric material as a matrix for the selector and then incorporating a dopant by an ion implantation process. In this case, since the ion implantation process is performed in a vertical direction, a dopant profile may be non-uniformly formed in a vertical direction. That is, due to a matrix loss on an upper surface of the selector and a dopant pile-up at an interface with a layer disposed below the selector, a dopant concentration may be decreased toward an upper portion and a lower portion with respect to Rp (projection distance) so that the selector has a non-uniform dopant profile in a vertical direction. Since the non-uniform dopant profile of the selector may cause cell-to-cell distribution, a cell array operation may be deteriorated, and a burden may be applied to a controller. In some implementations, since a pitch (e.g., a center-to-center distance between adjacent layers) needs to decrease to highly integrate the semiconductor device, it may be necessary to use a spacer patterning technique (SPT) in patterning the selector. The SPT may include forming a spacer and patterning the selector using the spacer. In using the SPT, however, the process efficiency can decrease and the production cost and difficulty can increase due to its additional fabrication process step.

In some implementations of the disclosed technology, however, a dopant profile of the selector layer 122 may uniform. That is, the selector layer 122 may include a dielectric material and a dopant doped with a uniform dopant profile both in a direction parallel to a surface of the layer and in a direction perpendicular to a surface of the layer. As such, since the selector layer 122 has a uniform dopant profile, it is possible to improve a cell-to-cell distribution and prevent or reduce deterioration of cell array operation and a burden on a controller.

In some implementations, the selector layer 122 may include a first portion 122-1 and a second portion 122-2.

The first portion 122-1 may be formed on the lower electrode layer 121. One sidewall of the first portion 122-1 may be in contact with the partition layer 103, and an upper portion of the other sidewall of the first portion 122-1 may be in contact with the third interlayer dielectric layer 104 and a lower portion of the other sidewall of the first portion 122-1 may be in contact with the second portion 122-2. In one example, the entire area of the sidewall can be in contact with the partition layer 103.

The second portion 122-2 may be formed between the second interlayer dielectric layer 102 and the third interlayer dielectric layer 104. Both sidewalls of the second portion 122-2 may be in contact with the first portion 122-1, respectively. In one example, the entire areas of both the sidewalls of the second portion 122-2 can be in contact with the first portion 122-1, respectively.

The formation of the selector layer 122 will be described in detail below with reference to FIGS. 3A to 3I.

The variable resistance layer 124 may serve to store data using the different resistance states of the variable resistance layer 123 (e.g., using high and low resistance states to represent digital level "1" and "0") by setting the variable resistance layer 123 into a desired resistance state, and to change a stored data bit by switching between different resistance states according to an applied voltage or current. The variable resistance layer 124 may have a single-layered structure or a multi-layered structure including at least one of materials used for an RRAM, a PRAM, an MRAM, an FRAM, and others. For example, the variable resistance layer 124 may include a metal oxide such as a transition metal oxide or a perovskite-based oxide for an RRAM, a phase change material such as a chalcogenide-based material for an PRAM, a ferromagnetic material for an MRAM, a ferroelectric material for an FRAM, or others. However, the implementations are not limited thereto, and the memory cell 120 may include other memory layers capable of storing data in various ways instead of the variable resistance layer 124.

In some implementations, the variable resistance layer 124 may include a magnetic tunnel junction (MTJ) structure. This will be explained with reference to FIG. 2.

Figure 2:
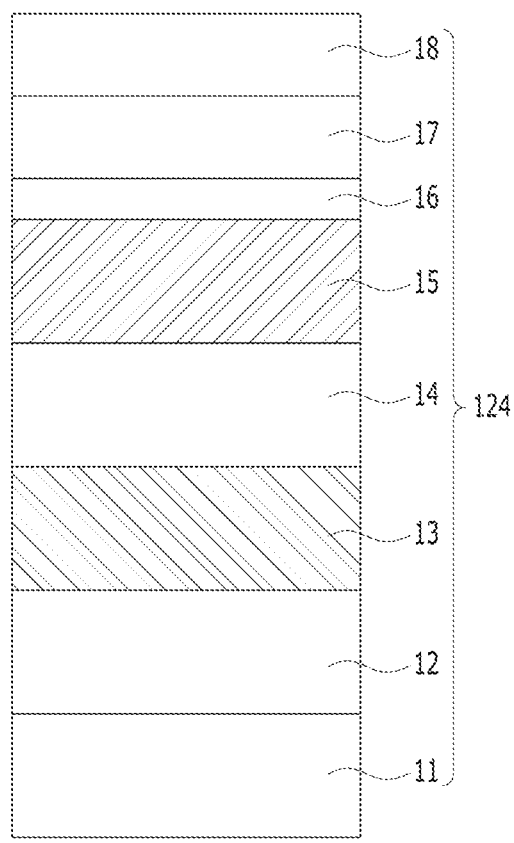
FIG. 2 illustrates an example of magnetic tunnel junction (MTJ) structure included in a variable resistance layer based on some implementations of the disclosed technology.

FIG. 2 illustrates an example of Magnetic Tunnel Junction (MTJ) structure included in the variable resistance layer 124. The variable resistance layer 124 may include an MTJ structure including a free layer 13 having a variable magnetization direction, a pinned layer 15 having a pinned magnetization direction and a tunnel barrier layer 14 interposed between the free layer 13 and the pinned layer 15.

The free layer 13 may have one of different magnetization directions or one of different spin directions of electrons to switch the polarity of the free layer 13 in the MTJ structure, resulting in changes in resistance value. In some implementations, the polarity of the free layer 13 is changed or flipped upon application of a voltage or current signal (e.g., a driving current above a certain threshold) to the MTJ structure. With the polarity changes of the free layer 13, the free layer 13 and the pinned layer 15 have different magnetization directions or different spin directions of electron, which allows the variable resistance layer 124 to store different data or represent different data bits. The free layer 13 may also be referred as a storage layer. The magnetization direction of the free layer 13 may be substantially perpendicular to a surface of the free layer 13, the tunnel barrier layer 14 and the pinned layer 15. In other words, the magnetization direction of the free layer 13 may be substantially parallel to stacking directions of the free layer 13, the tunnel barrier layer 14 and the pinned layer 15. Therefore, the magnetization direction of the free layer 13 may be changed between a downward direction and an upward direction. The change in the magnetization direction of the free layer 13 may be induced by a spin transfer torque generated by an applied current or voltage.

The free layer 13 may have a single-layer or multilayer structure including a ferromagnetic material. For example, the free layer 13 may include an alloy based on Fe, Ni or Co, for example, an Fe—Pt alloy, an Fe—Pd alloy, a Co—Pd alloy, a Co—Pt alloy, a Co—Fe alloy, an Fe—Ni—Pt alloy, a Co—Fe—Pt alloy, a Co—Ni—Pt alloy, or a Co—Fe—B alloy, or others, or may include a stack of metals, such as Co/Pt, or Co/Pd, or others.

The tunnel barrier layer 14 may allow the tunneling of electrons in both data reading and data writing operations. In a write operation for storing new data, a high write current may be directed through the tunnel barrier layer 14 to change the magnetization direction of the free layer 13 and thus to change the resistance state of the MTJ for writing a new data bit. In a reading operation, a low reading current may be directed through the tunnel barrier layer 14 without changing the magnetization direction of the free layer 13 to measure the existing resistance state of the MTJ under the existing magnetization direction of the free layer 13 to read the stored data bit in the MTJ. The tunnel barrier layer 14 may include a dielectric oxide such as MgO, CaO, SrO, TiO, VO, or NbO or others.

The pinned layer 15 may have a pinned magnetization direction, which remains unchanged while the magnetization direction of the free layer 13 changes. The pinned layer 15 may be referred to as a reference layer. In some implementations, the magnetization direction of the pinned layer 15 may be pinned in a downward direction. In some implementations, the magnetization direction of the pinned layer 15 may be pinned in an upward direction.

The pinned layer 15 may have a single-layer or multilayer structure including a ferromagnetic material. For example, the pinned layer 15 may include an alloy based on Fe, Ni or Co, for example, an Fe—Pt alloy, an Fe—Pd alloy, a Co—Pd alloy, a Co—Pt alloy, a Co—Fe alloy, an Fe—Ni—Pt alloy, a Co—Fe—Pt alloy, a Co—Ni—Pt alloy, or a Co—Fe—B alloy, or may include a stack of metals, such as Co/Pt, or Co/Pd or others.

If a voltage or current is applied to the variable resistance layer 124, the magnetization direction of the free layer 13 may be changed by spin torque transfer. In some implementations, when the magnetization directions of the free layer 13 and the pinned layer 15 are parallel to each other, the variable resistance layer 124 may be in a low resistance state, and this may indicate digital data bit "0." Conversely, when the magnetization directions of the free layer 13 and the pinned layer 15 are anti-parallel to each other, the variable resistance layer 124 may be in a high resistance state, and this may indicate a digital data bit "1." In some implementations, the variable resistance layer 124 can be configured to store data bit '1' when the magnetization directions of the free layer 13 and the pinned layer 15 are parallel to each other and to store data bit '0' when the magnetization directions of the free layer 13 and the pinned layer 15 are anti-parallel to each other.

In some implementations, the variable resistance layer 124 may further include one or more layers performing various functions to improve a characteristic of the MTJ structure. For example, the variable resistance layer 124 may further include at least one of a buffer layer 11, an under layer 12, a spacer layer 16, a magnetic correction layer 17 and a capping layer 18.

The under layer 12 may be disposed under the free layer 13 and serve to improve perpendicular magnetic crystalline anisotropy of the free layer 13. The under layer 12 may have a single-layer or multilayer structure including a metal, a metal alloy, a metal nitride, or a metal oxide, or a combination thereof.

The buffer layer 11 may be disposed below the under layer 12 to facilitate crystal growth of the under layer 12, thus improving perpendicular magnetic crystalline anisotropy of the free layer 13. The buffer layer 11 may have a single-layer or multilayer structure including a metal, a metal alloy, a metal nitride, or a metal oxide, or a combination thereof. Moreover, the buffer layer 11 may be formed of or include a material having a good compatibility with a bottom electrode (not shown) in order to resolve the lattice constant mismatch between the bottom electrode and the under layer 12. For example, the buffer layer 11 may include tantalum (Ta).

The spacer layer 16 may be interposed between the magnetic correction layer 17 and the pinned layer 15 and function as a buffer between the magnetic correction layer 17 and the pinned layer 15. The spacer layer 16 may serve to improve characteristics of the magnetic correction layer 17. The spacer layer 16 may include a noble metal such as ruthenium (Ru).

The magnetic correction layer 17 may serve to offset the effect of the stray magnetic field produced by the pinned layer 15. In this case, the effect of the stray magnetic field of the pinned layer 15 can decrease, and thus a biased magnetic field in the free layer 13 can decrease. The magnetic correction layer 17 may have a magnetization direction anti-parallel to the magnetization direction of the pinned layer 15. In the implementation, when the pinned layer 15 has a downward magnetization direction, the magnetic correction layer 17 may have an upward magnetization direction. Conversely, when the pinned layer 15 has an upward magnetization direction, the magnetic correction layer 17 may have a downward magnetization direction. The magnetic correction layer 17 may be exchange coupled with the pinned layer 15 via the spacer layer 16 to form a synthetic anti-ferromagnet (SAF) structure. The magnetic correction layer 17 may have a single-layer or multilayer structure including a ferromagnetic material.

In this implementation, the magnetic correction layer 17 is located above the pinned layer 15, but the magnetic correction layer 17 may disposed at a different location. For example, the magnetic correction layer 17 may be located above, below, or next to the MTJ structure while the magnetic correction layer 17 is patterned separately from the MTJ structure.

The capping layer 18 may serve to protect the variable resistance layer 124 and/or function as a hard mask for patterning the variable resistance layer 124. In some implementations, the capping layer 18 may include various conductive materials such as a metal. In some implementations, the capping layer 18 may include a metallic material having almost none or a small number of pin holes and high resistance to wet and/or dry etching. In some implementations, the capping layer 18 may include a metal, a nitride, or an oxide, or a combination thereof. For example, the capping layer 18 may include a noble metal such as ruthenium (Ru).

The capping layer 18 may have a single-layer or multilayer structure. In some implementations, the capping layer 18 may have a multilayer structure including an oxide, or a metal, or a combination thereof. For example, the capping layer 18 may have a multilayer structure of an oxide layer, a first metal layer and a second metal layer.

A material layer (not shown) for resolving the lattice structure differences and the lattice constant mismatch between the pinned layer 15 and the magnetic correction layer 17 may be interposed between the pinned layer 15 and the magnetic correction layer 17. For example, this material layer may be amorphous and may include a metal a metal nitride, or metal oxide.

In some implementations, each of the memory cell 120 includes the lower electrode layer 121, the selector layer 122, the middle electrode layer 123, the variable resistance layer 124 and the upper electrode layer 125 which are sequentially stacked. However, the memory cells 120 may have different structures. In some implementations, the selector layer 122 and the variable resistance layer 124 may be stacked in a different order. For example, the selector layer 122 and the variable resistance layer 124 may be stacked in a reverse order with respect to the orientation shown in FIG. 1B, such that the selector layer 122 may be disposed over the variable resistance layer 124. In some implementations, at least one of the lower electrode layer 121, the middle electrode layer 123, and the upper electrode layer 125 may be omitted. In some implementations, in addition to the layers 121 to 125 shown in FIG. 1B, the memory cells 120 may further include one or more layers (not shown) for enhancing characteristics of the memory cells 120 or improving fabricating processes.

In some implementations, neighboring memory cells of the plurality of memory cells 120 may be spaced apart from each other at a predetermined interval, and trenches may be present between the plurality of memory cells 120. A trench between neighboring memory cells 120 may have a height to width ratio (i.e., an aspect ratio) in a range from 1:1 to 40:1, from 10:1 to 40:1, from 10:1 to 20:1, from 5:1 to 10:1, from 10:1 to 15:1, from 1:1 to 25:1, from 1:1 to 30:1, from 1:1 to 35:1, or from 1:1 to 45:1.

In some implementations, the trench may have sidewalls that are substantially perpendicular to an upper surface of the substrate 100. In some implementations, neighboring trenches may be spaced apart from each other by an equal or similar distance.

In some implementations, the semiconductor device may include further layers in addition to the first conductive line 110, the memory cell 120 and the second conductive line 130. For example, a lower electrode contact may be further formed between the first conductive line 110 and the lower electrode layer 121 and an upper electrode contact may be further formed between the second conductive line 130 and the upper electrode layer 125.

Although one cross-point structure has been described, two or more cross-point structures may be stacked in a vertical direction perpendicular to a top surface of the substrate 100.

A method for fabricating a semiconductor device will be explained with reference to FIGS. 3A to 3I.

Figure 3A:
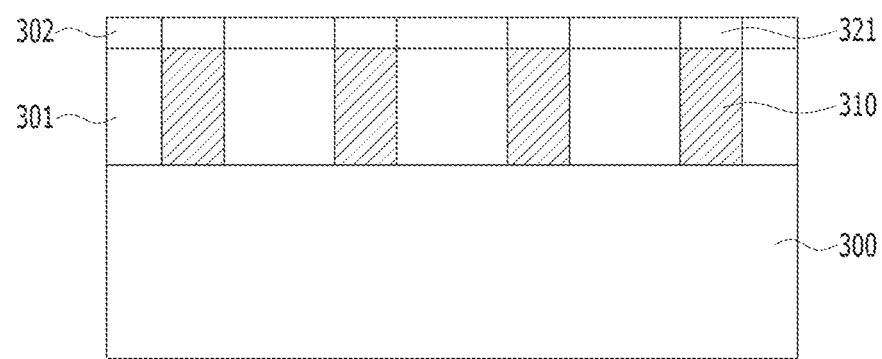
FIGS. 3A to 3I are cross-sectional views illustrating an example method for fabricating a semiconductor device based on some implementations of the disclosed technology.

Referring to FIG. 3A, first conductive lines 310 may be formed over a substrate 300 in which a predetermined structure is formed. The first conductive lines 310 may be formed by forming a first interlayer dielectric layer 301 having a trench for forming the first conductive lines 310 over the substrate 300, forming a conductive layer for the first conductive lines 310, and etching the conductive layer using a mask pattern in a line shape extending in a first direction.

A lower electrode layer 321 may be formed over the first conductive lines 310. The lower electrode layer 321 may be formed by forming a second interlayer dielectric layer 302 having a hole over the structure in which the first conductive lines 310 are formed, forming a material layer for the lower electrode layer 321, and performing a planarization process such as a chemical mechanical planarization (CMP).

The first interlayer dielectric layer 301 and the second interlayer dielectric layer 302 may include an oxide, a nitride, or a combination thereof.

Figure 3B:
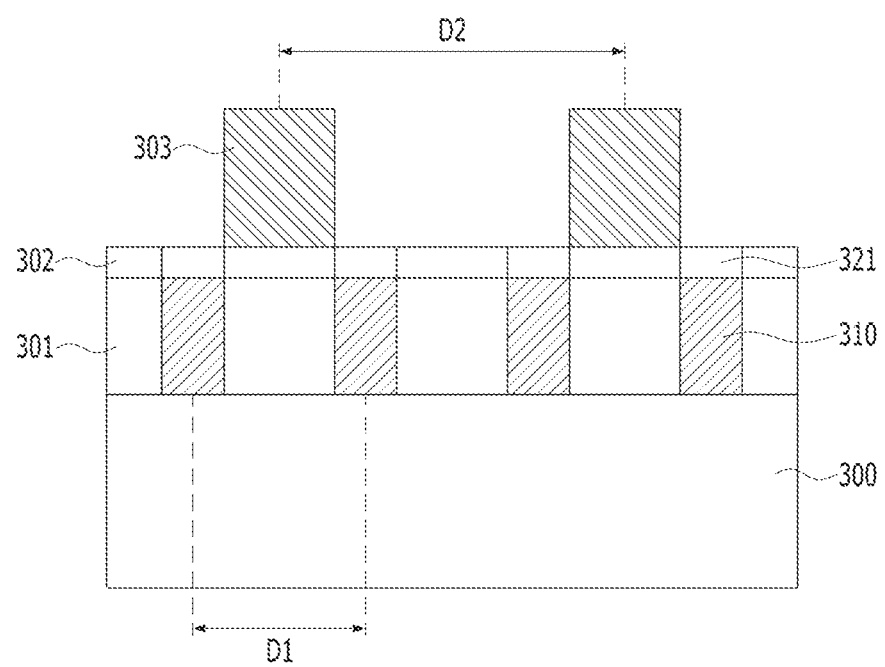

Referring to FIG. 3B, a partition layer 303 may be formed over the second interlayer dielectric layer 302 of the structure of FIG. 3A.

A pitch D2 between the partition layers 303 may be approximately twice a pitch D1 between the first conductive lines 310. In one example, the pitch D2 can indicate a center-to-center distance between adjacent partition layers 303, and the pitch D1 can indicate a center-to-center distance between adjacent first conductive lines 310.

The partition layer 303 may be formed of a dielectric material. For example, the partition layer 303 may include an oxide, a nitride, or a combination thereof.

Figure 3C:
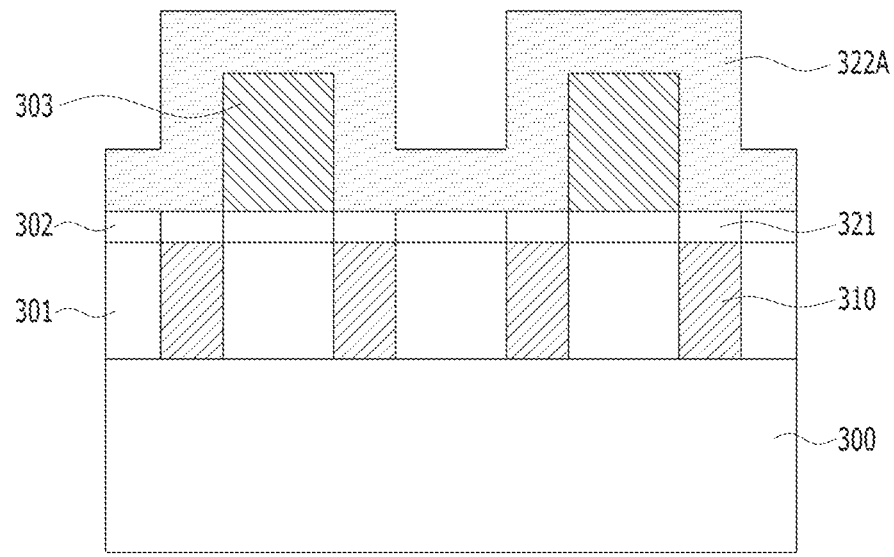

Referring to FIG. 3C, a matrix layer 322A for a selector layer (see, reference numeral 322 of FIG. 3G) may be formed on the structure of FIG. 3B.

The matrix layer 322A may be a layer to be formed as the selector layer 322 by introducing a dopant through a subsequent ion implantation process.

The matrix layer 322A may be conformally formed over the structure of FIG. 3B. That is, the matrix layer 322A may be formed so as to cover the second interlayer dielectric layer 302, the lower electrode layer 321 and the partition layer 303.

The matrix layer 322A may be formed by a common deposition method such as chemical vapor deposition (CVD), atomic layer deposition (ALD), or others.

The matrix layer 322A may include a dielectric material. For example, the matrix layer 322A may include an oxide, a nitride, or an oxynitride, or a combination thereof. For example, the oxide, the nitride, or the oxynitride, or the combination thereof may include silicon oxide, titanium oxide, aluminum oxide, tungsten oxide, hafnium oxide, tantalum oxide, niobium oxide, silicon nitride, titanium nitride, aluminum nitride, tungsten nitride, hafnium nitride, tantalum nitride, niobium nitride, silicon oxynitride, titanium oxynitride, aluminum oxynitride, tungsten oxynitride, hafnium oxynitride, tantalum oxynitride, or niobium oxynitride, or a combination thereof.

Figure 3D:
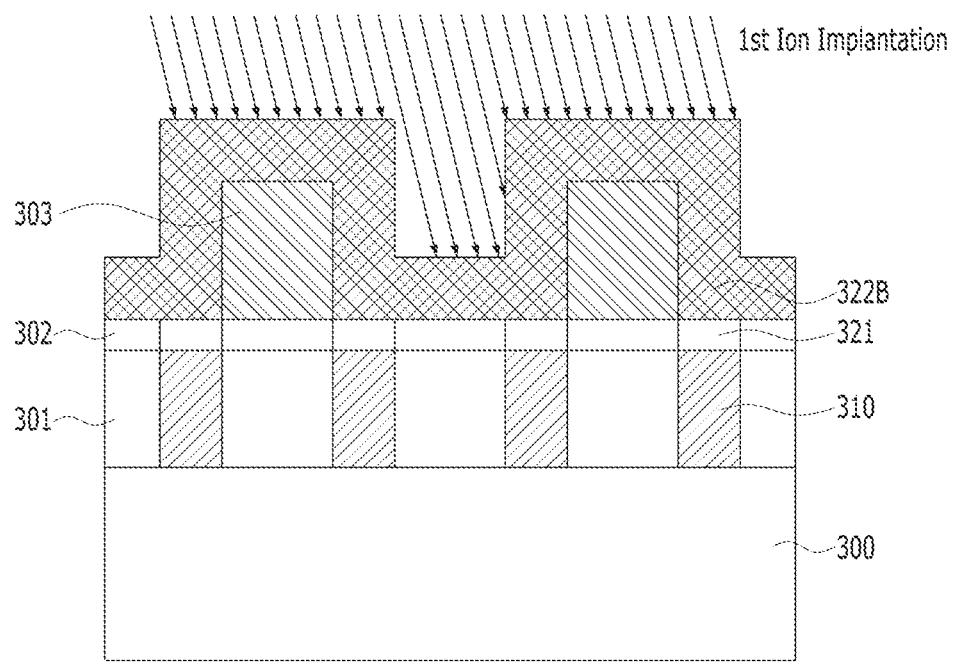

Referring to FIG. 3D, a first ion implantation process may be performed on the structure of FIG. 3C. A dopant may be incorporated into the matrix layer 322A by the first ion implantation process to form an initial selector layer 322B.

The first ion implantation process may be formed by a tilted ion implantation.

Figure 3E:
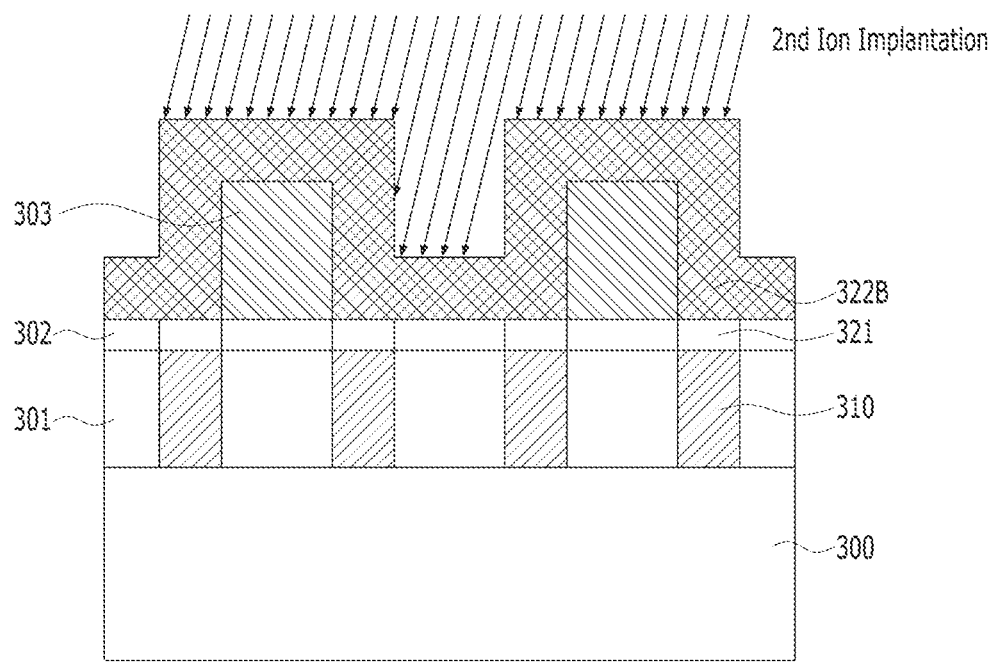

In the implementation, the selector layer 322 may have a uniform dopant profile in a vertical direction by performing tilted ion implantation twice in either direction instead of vertical ion implantation (see, FIGS. 3D and 3E). The tilted ion implantation may be performed at a tilt angle with respect to a line perpendicular to surfaces of the layers.

In some implementations, the tilted ion implantation may be performed with a tilt angle of about 45 to 85 degrees in order to prevent a shadow effect due to an adjacent pattern.

The dopant introduced by the first ion implantation process may include one or more of boron (B), nitrogen (N), carbon (C), phosphorous (P), arsenic (As), aluminum (Al), silicon (Si) and germanium (Ge).

Referring to FIG. 3E, a second ion implantation process may be performed on the structure of FIG. 3D.

The second ion implantation process may be performed by a tilted ion implantation. The tilted ion implantation may be performed with a tilt angle of about 45 to 85 degrees in order to prevent a shadow effect due to an adjacent pattern.

The second ion implantation process may be performed in an opposite direction to the first ion implantation process with respect to a line perpendicular to a surface of the layer. That is, when the first ion implantation process is performed in a direction from an upper left to a lower right, the second ion implantation process may be performed in a direction from an upper right to a lower left. When the first ion implantation process is performed in a direction from an upper right to a lower left, the second ion implantation process may be performed in a direction from an upper left to a lower right.

The dopant introduced by the first ion implantation process may include one or more of boron (B), nitrogen (N), carbon (C), phosphorous (P), arsenic (As), aluminum (Al), silicon (Si) and germanium (Ge).

In some implementations, the dopant introduced by the first ion implantation process and the dopant introduced by the second ion implantation process may be the same as each other.

In some implementations, the dopant introduced by the first ion implantation process and the dopant introduced by the second ion implantation process may be different from each other.

In this way, the initial selector layer 322B including the dielectric material and the dopant may be formed by conformally forming the matrix layer 322A and performing tilted ion implantation process twice in each direction. The initial selector layer 322B may have a uniform dopant profile both in a parallel direction and in a perpendicular direction with respect to a surface of the layer.

Figure 3F:
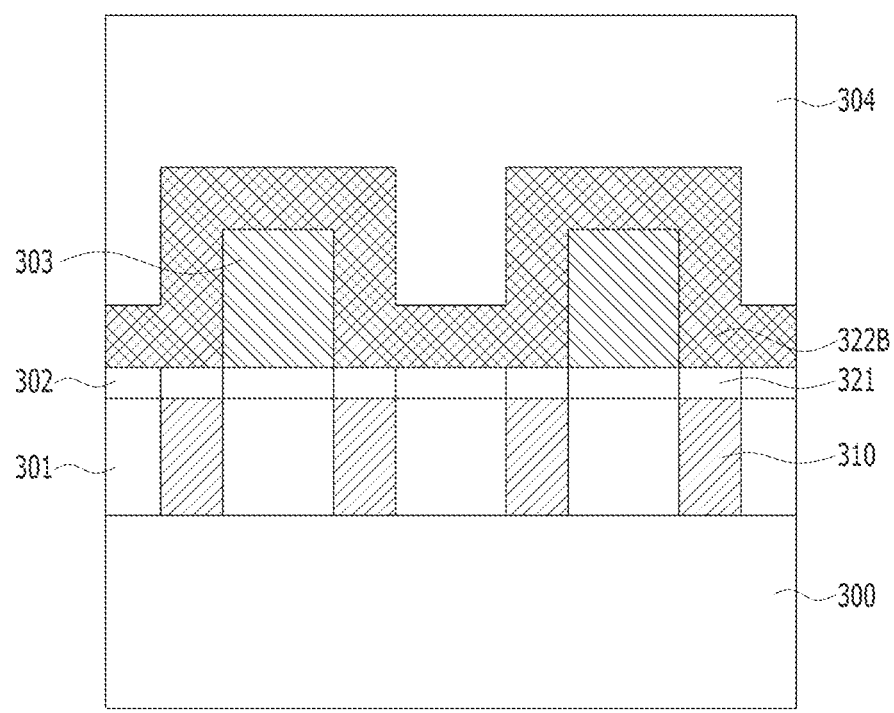

Referring to FIG. 3F, a third interlayer dielectric layer 304 may be formed over the structure of FIG. 3E.

The third interlayer dielectric layer 304 may include an oxide, a nitride, or a combination thereof.

Figure 3G:
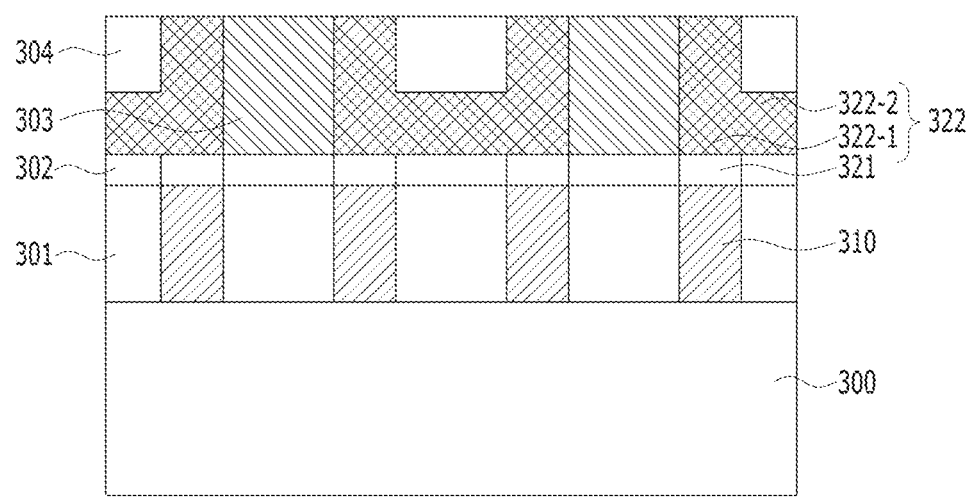

Referring to FIG. 3G, a planarization process such as a CMP process may be performed to expose the partition layer 303.

The initial selector layer 322B may be separated by the partition layer 303 through the planarization process to form the selector layer 322.

The selector layer 322 may include a first portion 322-1 and a second portion 322-2.

The first portion 322-1 may be formed over the lower electrode layer 321. One sidewall of the first portion 322-1 may be in contact with the partition layer 303, and an upper portion of the other sidewall of the first portion 322-1 may be in contact with the third interlayer dielectric layer 304 and a lower portion of the other sidewall of the first portion 322-1 may be in contact with the second portion 322-2. In one example, the entire area of the sidewall can be in contact with the partition layer 303.

The second portion 322-2 may be formed between the second interlayer dielectric layer 302 and the third interlayer dielectric layer 304. Both sidewalls of the second portion 322-2 may be in contact with the first portion 322-1, respectively. In one example, the entire areas of both the sidewalls of the second portion 322-2 can be in contact with the first portion 322-1, respectively.

The selector layer 322 may include the dielectric material and the dopant. The selector layer 322 may have a uniform dopant profile both in a parallel direction and a perpendicular direction with respect to a surface of the layer.

In the implementations, the selector layer 322 may be implemented by the method as described above without using an SPT even though a pitch is reduced to, for example, 50 nm.

Figure 3H:
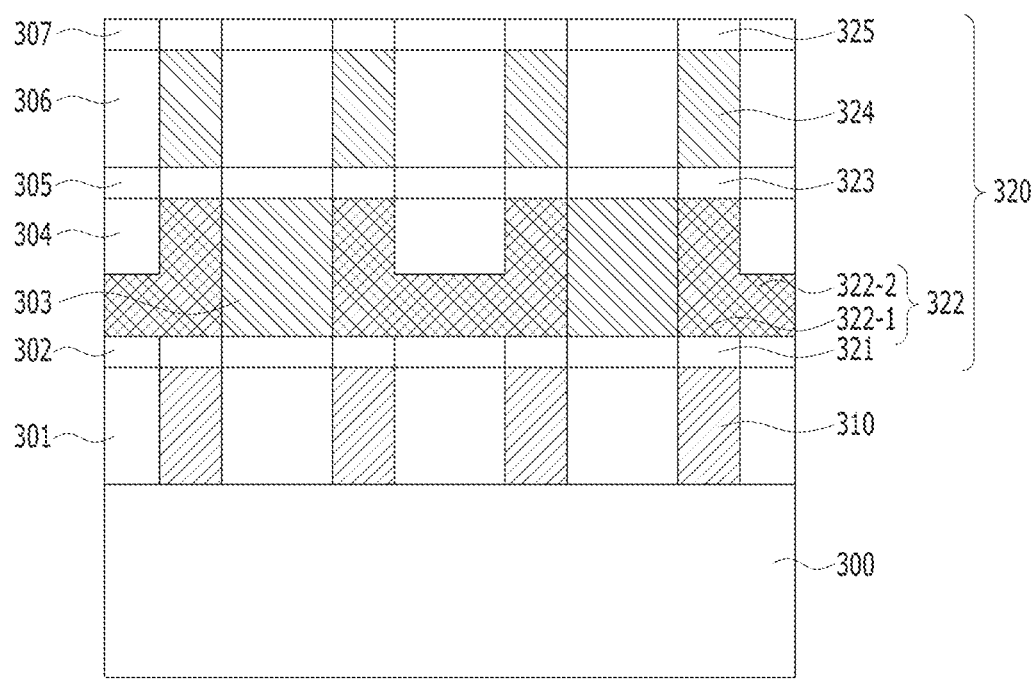

Referring to FIG. 3H, a middle electrode layer 323, a variable resistance layer 324 and an upper electrode layer 324 may be sequentially formed over the structure of FIG. 3G. As a result, a memory cell 320 including the lower electrode layer 321, the selector layer 322, the middle electrode layer 323, the variable resistance layer 324 and the upper electrode layer 125 may be formed.

The middle electrode layer 323 may be formed by forming a fourth interlayer dielectric layer 305 having a hole over the structure of FIG. 3G, forming a material layer for the middle electrode layer 323 in the hole, and performing a planarization process such as a CMP process.

The variable resistance layer 324 may be formed by forming a material layer for the variable resistance layer 324 after forming the middle electrode layer 323 and patterning the material layer. Then, a fifth interlayer dielectric layer 306 may be formed.

The upper electrode layer 324 may be formed by forming a fifth interlayer dielectric layer 306 having a hole after forming the variable resistance layer 324, forming a material layer for the upper electrode layer 324 in the hole, and performing a planarization process such as a CMP process.

In the implementation, the middle electrode layer 323, the variable resistance layer 324 and the upper electrode layer 324 may be formed by separate processes. In another implementation, at least two layers of the middle electrode layer 323, the variable resistance layer 324 and the upper electrode layer 324 may be formed by one process. For example, the middle electrode layer 323 and the variable resistance layer 324 may be formed by sequentially forming a material layer for the middle electrode layer 323 and a material layer for the variable resistance layer 324 and patterning the material layers at the same time, and then the upper electrode layer 324 may be formed by the method as described above. Alternatively, the middle electrode layer 323, the variable resistance layer 324 and the upper electrode layer 324 may be formed by sequentially forming a material layer for the middle electrode layer 323, a material layer for the variable resistance layer 324 and a material layer for the upper electrode layer 324 and patterning the material layers at the same time.

Figure 3I:
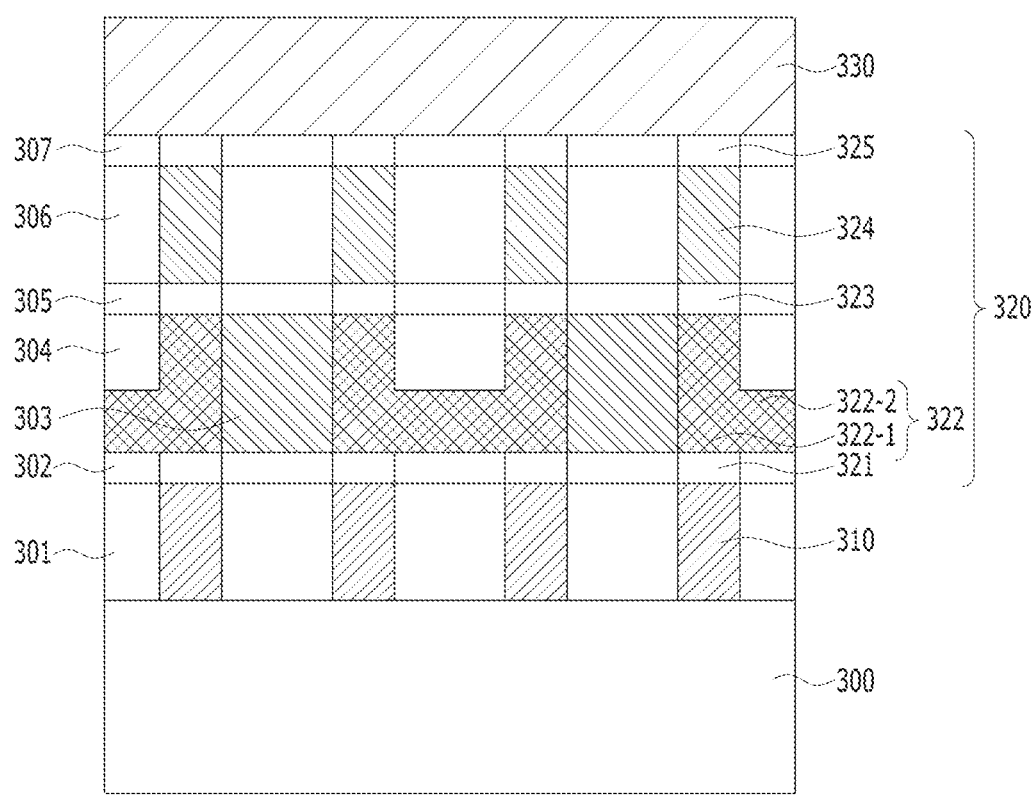

Referring to FIG. 3I, second conductive lines 330 may be formed over the structure of FIG. 3H.

The second conductive lines 330 may be formed by forming a conductive layer for the second conductive lines 330 over the upper electrode layer 324 and etching the conductive layer by using a mask pattern in a line shape extending in a second direction.

Through the processes as described above, the semiconductor device including the first conductive lines 310, the memory cell 320 and the second conductive lines 330 may be formed. The memory cell 320 may include the lower electrode layer 321, the selector layer 322, the middle electrode layer 323, the variable resistance layer 324 and the upper electrode layer 324 which are sequentially stacked.

The selector layer 322 may include the first portion 322-1 formed over the lower electrode layer 321 and the second portion 322-2 formed between the second interlayer dielectric layer 302 and the third interlayer dielectric layer 304. One sidewall of the first portion 322-1 may be in contact with the partition layer 303, and an upper portion of the other sidewall of the first portion 322-1 may be in contact with the third interlayer dielectric layer 304 and a lower portion of the other sidewall of the first portion 322-1 may be in contact with the second portion 322-2. In one example, the entire area of the sidewall of the first portion 322-1 can be in contact with the partition layer 303. Both sidewalls of the second portion 122-2 may be in contact with the first portion 322-1, respectively. In one example, the entire areas of both the sidewalls of the second portion 122-2 can be in contact with the first portion 322-1, respectively.

The selector layer 322 may include the dielectric material and the dopant and have a uniform dopant profile both in a parallel direction and a perpendicular direction with respect to the surface of the layer. Thus, according to the implementations, cell-to-cell distribution can be improved to prevent or reduce deterioration of a cell array operation and a burden on a controller. Moreover, according to the implementations, the selector layer 322 can be formed through a single patterning process instead of SPT, thereby reducing process difficulty and process cost and increasing process efficiency.

The substrate 300, the first conductive lines 310, the memory cell 320, the lower electrode layer 321, the selector layer 322, the middle electrode layer 323, the variable resistance layer 324, the upper electrode layer 324 and the second conductive lines 330 may correspond to the substrate 100, the first conductive line 110, the memory cell 120, the lower electrode layer 121, the selector layer 122, the middle electrode layer 123, the variable resistance layer 124, the upper electrode layer 125 and the second conductive line 130, respectively.

While this patent document contains many specifics, these should not be construed as limitations on the scope of any disclosure or of what may be claimed, but rather as descriptions of features that may be specific to particular embodiments of particular disclosures. Certain features that are described in this patent document in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few embodiments and examples are described. Enhancements and variations of the disclosed embodiments and other embodiments can be made based on what is described and illustrated in this patent document.

What is claimed is:

1. A method for fabricating a semiconductor device comprising:
   forming trenches on a dielectric material formed over a substrate;
   forming first conductive lines in the trenches such that first conductive lines and first dielectric layers are arranged over the substrate;
   forming partition layers over the first dielectric layers at a first center-to-center distance between adjacent first dielectric layers, wherein the first center-to-center distance is twice a center-to-center distance between adjacent first conductive lines, and wherein the partition layers include a dielectric material;
   forming a dielectric material layer to be formed as a selector layer over the first conductive lines, the first dielectric layers and the partition layers; and
   forming an initial selector layer by performing a first ion implantation of a dopant into the dielectric material layer at a first tilt angle and by performing a second ion implantation of the dopant into the dielectric material layer at a second tilt angle,
   wherein the first tilt angle is in an opposite direction to the second tilt angle with respect to a line perpendicular to surfaces of the layers, and
   the initial selector layer has a uniform dopant profile.

2. The method according to claim 1, further comprising:
   forming second dielectric layers to cover a structure in which the initial selector layer; and
   forming the selector layer by performing a planarization process to expose the partition layers.

3. The method according to claim 2, where the selector layer includes a first portion and a second portion,
   the first portion is disposed over the first conductive lines, and the second portion is disposed over the first dielectric layers and below the second dielectric layers,
   a first side wall of the first portion is in contact with an adjacent partition layer, and an upper portion of a second sidewall of the first portion is in contact with an adjacent second dielectric layer and a lower portion of the second sidewall of the first portion is in contact with the second portion, and
   first and second sidewalls of the second portion are in contact with the first portion.

4. The method according to claim 2, wherein the selector layer has a uniform dopant profile.

5. The method according to claim 1, wherein the first tilt angle is an angle of 45 to 85 degrees with respect to the line perpendicular to the surfaces of the layers and the second tilt angle is an angle of 45 to 85 degrees with respect to the line perpendicular to the surfaces of the layers.

6. The method according to claim 1, wherein the dielectric material layer includes silicon oxide, titanium oxide, aluminum oxide, tungsten oxide, hafnium oxide, tantalum oxide, niobium oxide, silicon nitride, titanium nitride, aluminum nitride, tungsten nitride, hafnium nitride, tantalum nitride, niobium nitride, silicon oxynitride, titanium oxynitride, aluminum oxynitride, tungsten oxynitride, hafnium oxynitride, tantalum oxynitride, or niobium oxynitride, or a combination of two or more of silicon oxide, titanium oxide, aluminum oxide, tungsten oxide, hafnium oxide, tantalum oxide, niobium oxide, silicon nitride, titanium nitride, aluminum nitride, tungsten nitride, hafnium nitride, tantalum nitride, niobium nitride, silicon oxynitride, titanium oxynitride, aluminum oxynitride, tungsten oxynitride, hafnium oxynitride, tantalum oxynitride, or niobium oxynitride.

7. The method according to claim 1, wherein the dopant includes one or more selected from boron (B), nitrogen (N), carbon (C), phosphorous (P), arsenic (As), aluminum (Al), silicon (Si) and germanium (Ge).

8. The method according to claim 1, wherein the partition layer, the first dielectric layer and the second dielectric layer include a same dielectric material as each other, or different dielectric materials from each other.

9. The method according to claim 2, further comprising forming a variable resistance layer over or below the selector layer.

* * * * *